United States Patent
Balaji et al.

(10) Patent No.: US 8,347,317 B1
(45) Date of Patent: Jan. 1, 2013

(54) STRATEGICALLY PROVIDING EVENT NOTIFICATIONS IN LIGHT OF MULTIPLE NEARBY DEVICES

(75) Inventors: Thenthiruperai Srinivasan Balaji, Prairie Village, KS (US); Jesse Michael Kates, Kansas City, MO (US); Kristen Miller, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 977 days.

(21) Appl. No.: 12/353,739

(22) Filed: Jan. 14, 2009

(51) Int. Cl.
*G06F 9/44* (2006.01)
*G06F 3/00* (2006.01)

(52) U.S. Cl. ...................................... 719/318; 715/700

(58) Field of Classification Search ................... 719/318
See application file for complete search history.

(56) References Cited

U.S. PATENT DOCUMENTS

| | | | |
|---|---|---|---|
| 6,462,660 B1 * | 10/2002 | Cannon et al. | 340/572.1 |
| 7,877,082 B2 * | 1/2011 | Eagle et al. | 455/414.1 |
| 2005/0250552 A1 * | 11/2005 | Eagle et al. | 455/567 |
| 2008/0148148 A1 * | 6/2008 | Ramanathan et al. | 715/700 |

* cited by examiner

*Primary Examiner* — S. Sough
*Assistant Examiner* — Abdou Seye

(57) ABSTRACT

Systems, products, and methods are disclosed for performing a method of intelligently providing notification of an occurrence of an event in an environment in which potentially multiple devices might provide notification of the event; thereby reducing the number of devices that will provide the notification if those devices are nearby each other.

17 Claims, 7 Drawing Sheets

STRATEGICALLY PROVIDING EVENT NOTIFICATIONS IN LIGHT OF MULTIPLE NEARBY DEVICES

Many people are associated with multiple devices that are capable of notifying them of particular events. For example, consider a person who carries a mobile phone, a personal data assistant (PDA), and works with a personal computer (PC). Now consider that this person has several events that he or she wants to be kept apprised of. For example, say that this person has a business meeting at a certain time and is slated to attend a basketball game at another time. Assume still further that this person wants this event to be calendared on each of the three aforementioned devices.

Absent the technology associated with various embodiments of the present invention, each of the three devices would act independently to provide notification of these two events. That is, for example, this user might be working at the time notification of the business meeting is to be provided. In such a case, each of the three devices provides notification. For example, perhaps PDA vibrates, the mobile phone chimes, and the PC provides an on-screen notification. Of course, each device could provide notifications in a multitude of other ways, we are just providing a few examples.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, an ability for each of a set of devices to be aware of their local proximity to each other, and then condition providing notifications based on the knowledge of such proximity.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| NFC | Near Field Communication |
| PDA | Personal Data Assistant |
| RFID | Radio Frequency Identification |
| GPS | Global Positioning System |
| PC | Personal Computer |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
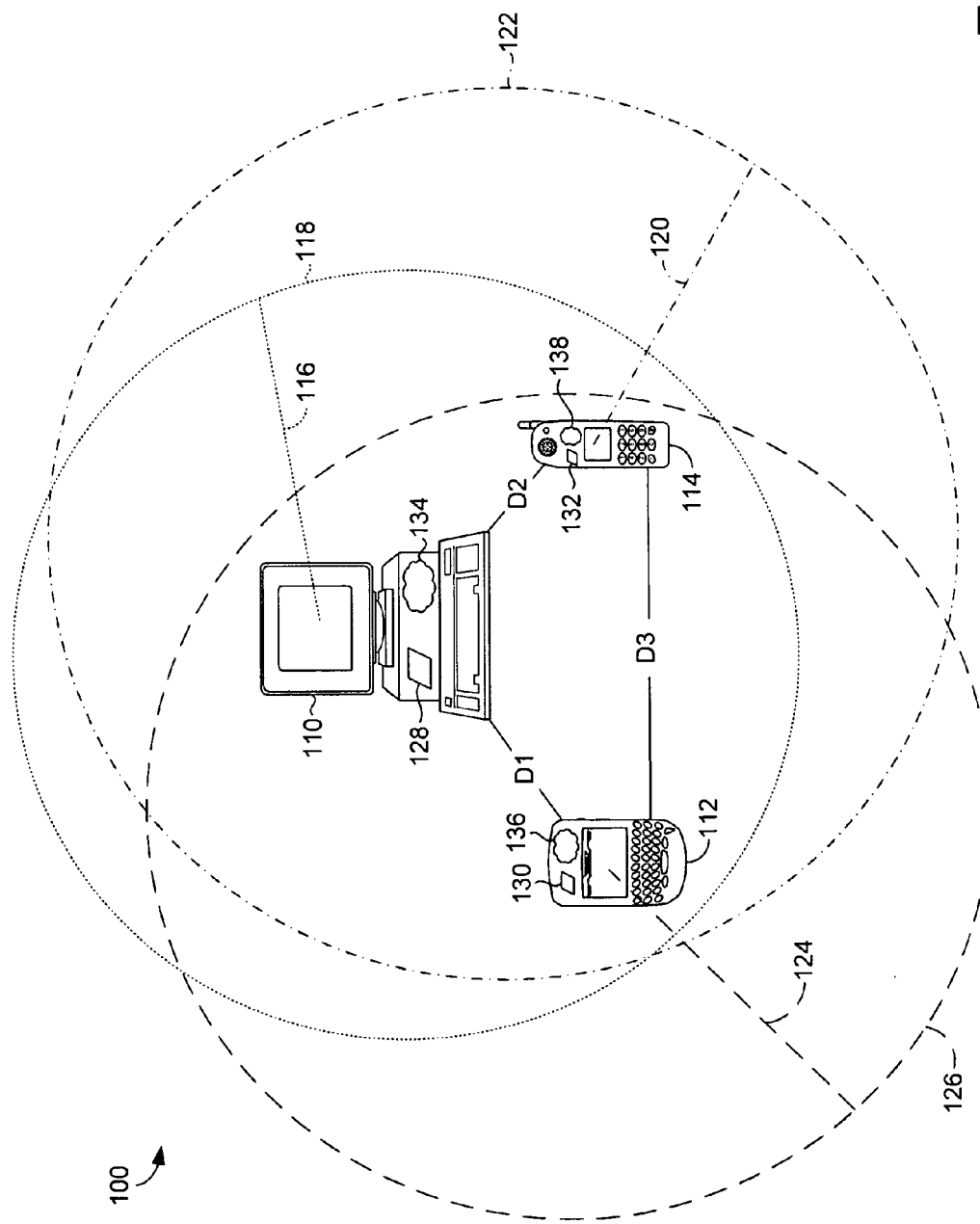
FIG. 1, depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 is illustrative in nature and is not meant to be limiting. We show three devices, but many more devices could also be utilized, with, and in fact is expressly contemplated as alternative embodiment of the present invention. As mentioned, three devices are shown: a PC 110, a PDA 112, and a cell phone 114. We certainly do not intend to convey bright-line distinctions between these three devices. We recognize that what one refers to as a PDA, another may refer to as a mobile device or cell phone or even PC. Rather, we are showing three devices with three names so that we can have three devices to refer to in the context of explaining embodiments of our invention. Other devices could also be used. For example, one device might be a person's automobile, while another device might be a person's refrigerator, assuming that each is equipped with the possibility of providing notifications of events.

Three different circles are shown having three radii. By way of example, a first radius 116 is associated with circle 118; a second radius 120 is associated with a circle 122, and a third radius 124 is associated with a circle 126. These radii and circles are shown so that we can discuss the invention, not to indicate actual circular or spherical ranges of communication. Each circle is meant to intend to convey a threshold range that, if another device is within, notifications are intelligently provided, each of a "threshold proximity." The threshold proximity is a distance that, in one embodiment, is used by a given device to determine whether it should be part of an intelligent-notification scheme, which we will describe in greater detail below.

For example, consider radius 116 that defines circle 118 and that is associated with PC 110. Any device within the threshold proximity that is schematically represented by radius 116 will be included in an intelligent-notification system described herein. As shown, PDA 112 and cell phone 114 are within threshold proximity 116, and thus will be part of an intelligent notification system. Specifically, PDA 112 is a certain distance away from PC 110. This distance is indicated by "D1." Similarly, "D2" refers to a distance that cell phone 114 is away from PC 110. "D3" indicates a distance between PDA 112 and cell phone 114.

In the illustrative example of FIG. 1, each device 110, 112, and 114 is within each other devices proximity (116, 120, 124), which means each of the three devices will be part of an intelligent-notification system such that notifications that would normally be presented independently of each device will now be presented only on specific devices depending upon how they are configured. These various factors can either be predefined or user configured, or even a combination of both based upon technologies used. For example, suppose that radius 116 is 8'. In one embodiment, this measurement is configured by a user who wishes to have embodiments of the present invention implicated whenever other devices are within 8' of his or her PC. By way of another example, it might be the case that the various proximities shown come about based on the type of technology that's used to communicate between the various devices.

An illustrative short-range wireless technology is commonly referred to today as "Bluetooth." Bluetooth technology operates within certain ranges. For some devices, as soon as they come within a certain distance of each other, which might be defined by the signal strength associated with Bluetooth transmissions, they automatically become aware of each other, or are "discovered." Another illustrative short-range technology includes what is referred to as Near-Field-Communications (NFC) technology. Again, we do not mean to indicate bright-line demarcations. Some artisans might characterize Bluetooth as a form of NFC technology, while others might presume NFC technologies to be a separate class. We provide, by way of example, two illustrative close-range wireless technologies for that purpose: by way of illustration. Still other technologies might be usable as well, such as variations of 802.11 technologies, or even infrared technologies. The actual technology that is used to facilitate communication between the devices could vary depending on implementation.

The same technologies that are used to communicate with each other might doubly be used to determine proximity. For example, consider a certain short-range wireless technology that only operates within a certain number of feet. For example, assume that a certain type of Bluetooth technology can only operate if it is within 30 feet of another device that it might communicate with. In such an example, the same technology that is being used to communicate data between the devices automatically provides a way to know whether the devices are within a given proximity of each other. If the two devices automatically discover each other, then they are close enough to operate. In such an example, a user might configure aspects of the invention to operate as long as the devices are aware of each other.

In such a case, perhaps a user's lifestyle is such that if the two devices are within a range that they can communicate with each other, then such communication is desired. But in other embodiments and/or other technologies, a user might configure a certain range, such as the aforementioned "8'." This might be particularly relevant if the proximity-detection technology is GPS. When GPS technology is used to determine the location of each object, and thus, a proximity of each object to each other object, then a user might configure minimum threshold proximities instead of relying on a communications ability. This might also be relevant if a variation of an 802.11 technology is used because those technologies can generally communicate over several tens or hundreds of feet.

We provide these various descriptions for illustrative purposes. In some embodiments GPS technology is used to determine location, and Bluetooth is used to communicate data. In other embodiments, signal strength or the presence of a device is used to determine proximity while communication is carried out by way of infrared technology. In one embodiment, a data structure embodied on a memory component of a given device stores notification information that describes which of the devices is to provide notification based on the occurrence of some event. For example, a data structure 128 might serve this purpose in connection with PC 110. Similarly, PDA 112 might include a data structure 130, while cellular phone 114 might include a data structure 132.

Control software embodied on the same or different computer-readable media carries out various functional aspects of the present invention and might take on a variety of forms. For example, the control software might include configuration settings, might facilitate communicating data between multiple devices, might handle updates, include user settings, etc. In some embodiments, each device has its own control software, which, by way of example, is illustrated by reference numerals 134 as to PC 110, 136 as to PDA 112, and 138 as to cell phone 114.

Figure 2:
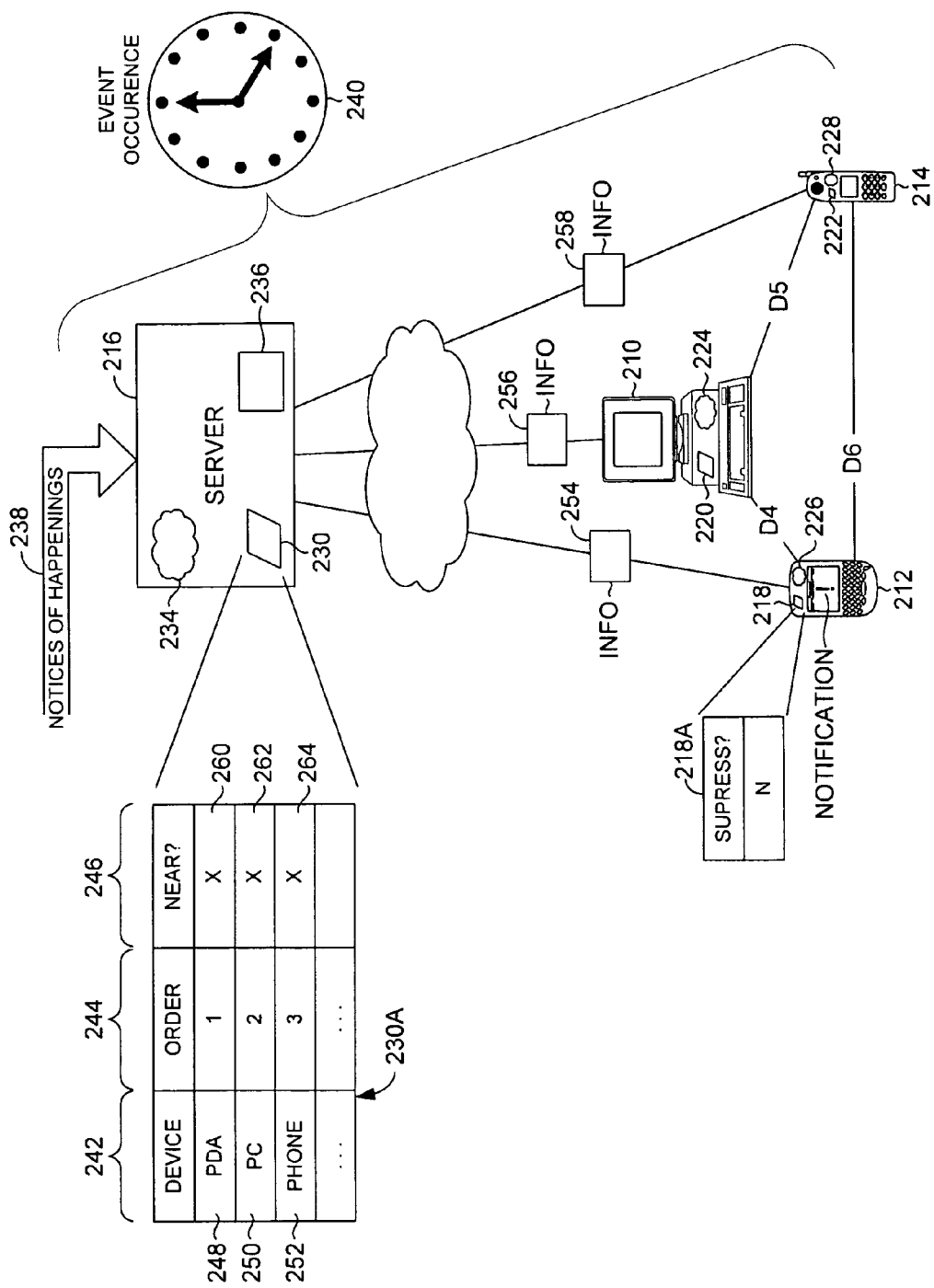
FIG. 2 depicts a block diagram of a relatively centralized embodiment of the present invention.

Having described some overview illustrative aspects of our technology, we will now describe some lower-level details of illustrative embodiments of our technology. With reference to FIG. 2, three devices are also shown: a PC 210, a PDA 212, and a cell phone 214. The three devices are separated by distances that are referred to in FIGS. 2 as D4, D5, and D6. FIG. 2 depicts an embodiment that is relatively more centralized than other embodiments. In this way, a server 216 helps manage how each of the various devices present notifications. In an illustrative embodiment, each device includes information that instructs it as to whether it should present a notification. In some embodiments, this information takes the form of a data structure, which can be as simple as a single bit.

For example, assume that a data structure 218 is provided on PDA 212, in some embodiments, this data structure 218 may take the form of a single bit which indicates whether a notification should be suppressed or not, which is indicated by reference numeral 218A. Recall that absent our technology, a device would normally present a notification independent of its proximity to other devices. PC 210 includes a data structure 220 in one embodiment. Cell phone 214 includes a data structure 222 as well. As was referred to in FIG. 1, each device might include control software, which is indicated by reference numerals 224 as to PC 210, 226 as to PDA 212, and 228 as to cell phone 214.

Similarly, server 216 might include a data structure 230, an example of which is provided in greater detail as shown by reference numeral 230A. Configuration or control software 234 might also be embodied on a storage component of server 216 to facilitate communication with various devices (e.g., 210, 212, 214) as well as other functions. Software 234 might also carry out calendaring functionality, or it might be carried out separately by a calendaring component 236, in which calendaring information is populated based on receiving notices of happenings 238 or based on the occurrence of some event 240.

Different types of calendaring events lend themselves to different types of logging. For example, sometimes a notice of happening 238 occurs. An example of this would include a notification of a real-time event. Perhaps a meeting in real time is requested, and a user's device is programmed to present an indication of such a real-time event. Other examples of calendaring events are scheduled. We pictorially show an event occurrence by reference numeral 240. Examples of event occurrences might be the arrival of a given point in time. For example, if a user has configured a one-week reminder associated with a dinner date, then upon the occurrence of that particular point in time happening, a notification will be provided.

Thus reference numeral 240 is being provided within the context of this patent disclosure so that we will have something to reference in connection with describing embodiments of the invention, but it is not meant to constrain or narrow the wide range of possibilities of different types of calendaring events. For the purposes of this document, we do not even mean to imply that a notice of happening is not an event occurrence. Thus, an event occurrence 240 includes any stimulus that is to give rise to a notification response.

As mentioned, table 230A describes an illustrative data structure that stores hierarchal, or rule, information that describes which device is to provide event notification when it is nearby other devices. Data structure 230A might take on a variety of forms. We illustratively show three columns and three rows, but do not mean to convey that only such is applicable. In the illustrative example provided, a device column 242 is shown along with an order column 244, and a near column 246. Device column 242 indicates to which of a variety of devices the other data items relate. Order Column 244 indicates a hierarchal order in which devices are to provide notification. For example, in the example shown, the PDA of cell 248 is to be given the highest order, then the PC of cell 250, and finally, the phone of cell 252. Thus, if all of the devices are nearby each other, then the PDA will be the only device that will provide notification of the occurrence of some event.

Absent our technology, assuming each of the devices was independently programmed to provide notification, then each device would have provided notification of the event irrespective of how close each of the devices was to each other. But according to an embodiment of our invention, if all three devices are nearby each other (indicated by an "X" in near column 246) then only one, or multiple if so configured devices provides notification. As just alluded to, a user might configure multiple devices to provide notification and exclude only some. Although this could be implemented in a variety of ways, an illustrative way of implementing such an embodiment would be to provide duplicate orders in order column 244. For example, perhaps the PDA and the PC were given the same order. Control application 234 might read this to indicate that both the PDA and the PC should provide notifications but not the phone.

As briefly alluded to earlier, FIG. 2 depicts a relatively more centralized embodiment of our technology. Even so, it might be the case that a list (such as that of 230A) is maintained at server 216, and pushed down to the various devices as updates to the list occur so that each device always has a local copy of the list, or in another embodiment, clients might check in with server 216 just prior to potentially providing event notification. Thus, in one embodiment, information is passed to each device so that each device is aware of whether or not it should suppress notifications that would otherwise have been provided absent our technology.

We show such illustrative information as boxes with numerals 254, 256, and 258. In this embodiment, as data structure 230A gets updated by way of devices moving beyond or within the relevant threshold proximities, notification information is pushed down to the various devices. As mentioned, this information might be as simple as a bit that indicates whether a device is to suppress its notifications. We will describe a few more aspects of this embodiment and then describe aspects of a hybrid-type approach in which each device is provided a copy of data structure 230A. This latter approach would enable still more functionality in some cases.

Further explaining what we will refer to as a type of minimalist approach, assume that data structure 230A reflects a current state of affairs in which each device, the PDA, the PC, and the phone, are sufficiently nearby each other that each is to partake in an intelligent-notification scheme. If this were the case, then information 254 would be provided to PDA 212 to indicate that its event notifications should not be suppressed. But information 256 was communicated to PC 210 to indicate that its event notifications should be suppressed. Similarly, information 258 would be communicated to cell phone 214 to indicate that its event notifications (all of the same event) should also be suppressed.

But now let us assume that PDA 212 is moved outside of the range that defines the relevant threshold proximity applicable to this scenario. Thus, PDA 212 is taken out of the proverbial picture. Now, a status change has occurred, cell 260 and data structure 230A might no longer be populated with an "X." Perhaps it is null or some other character. The highest priority, or ordered, item would be the PC. It would still be indicated as nearby by virtue of the "X" in cell 262 (likewise as to the phone and cell 264). Now, if a common-calendared event were to occur 240, then by virtue of information 256, PC 210 would provide notification of the relevant event while a potential notification of the same event would be suppressed on cell phone 214. Incidentally, event notification would probably also be provided by way of PDA 212 because default rules would likely indicate that if no suppression information is provided, then notifications should not be suppressed.

In another embodiment, and with continued reference to FIG. 2, information items 254, 256, and 258 might be copies of data structure 230A. That is, data structures 218, 220, and 222, might include the same information as stored in data structure 230A. In this embodiment, upon the occurrence 240 of some event, each device would inspect its respective data structure to determine its relative ranking. If it is not sufficiently high, then the device will know that event notifications should be suppressed. By way of example, a device might inspect its respected data structure, search for the highest-ordered item that also is nearby (e.g., includes an "X" in near column 246 for other logging scheme), determine whether it is the device that has the highest-indicated order, and if so, pass and present the notification, but if not, suppress the notification.

Other embodiments might contemplate a scenario that does not include a centralized server. For example, and with reference to FIG. 3, no centralized server is provided. As has been discussed, a PC 310 is shown along with a PDA 312, a first phone 314, as well as a second phone 316. First phone 314 is also referred to as "phone 1," and second phone 316 is also referred to as "phone 2." Each device might include a respective data structure. These are shown by reference numerals 318, 320, 322, and 324. Each device might also include control software, which is illustrated by reference numerals 326, 328, and 330.

Further, each device includes a wireless communicator in one embodiment (but we show only one—indicated by numeral 319—connection with PC 310 so as to not obscure aspects of the present invention). Second phone 316 might also include control software, but it is not shown because of size limitations. An occurrence of an event will be indicated by reference numeral 332. Just by way of example, location information of each device is determined by GPS technologies, which contemplate the use of one or more satellites such as satellite 334.

The notifications do not necessarily need to come from another device. Consider, for example, RFID technology, and passive RFID technology in particular. In passive RFID, one device senses the other without the other really doing anything. Thus, two devices could come in contact with each other and the passive device would not necessarily know it. But the device that includes a sensor that is configured to respond when a certain RFID tag is brought into its presence is made aware of the device. These comments are more of side notes to expound upon our earlier assertions that various technologies could be used in connection with various embodiments of the present invention. Further, each notification might indicate multiple devices.

Figure 3:
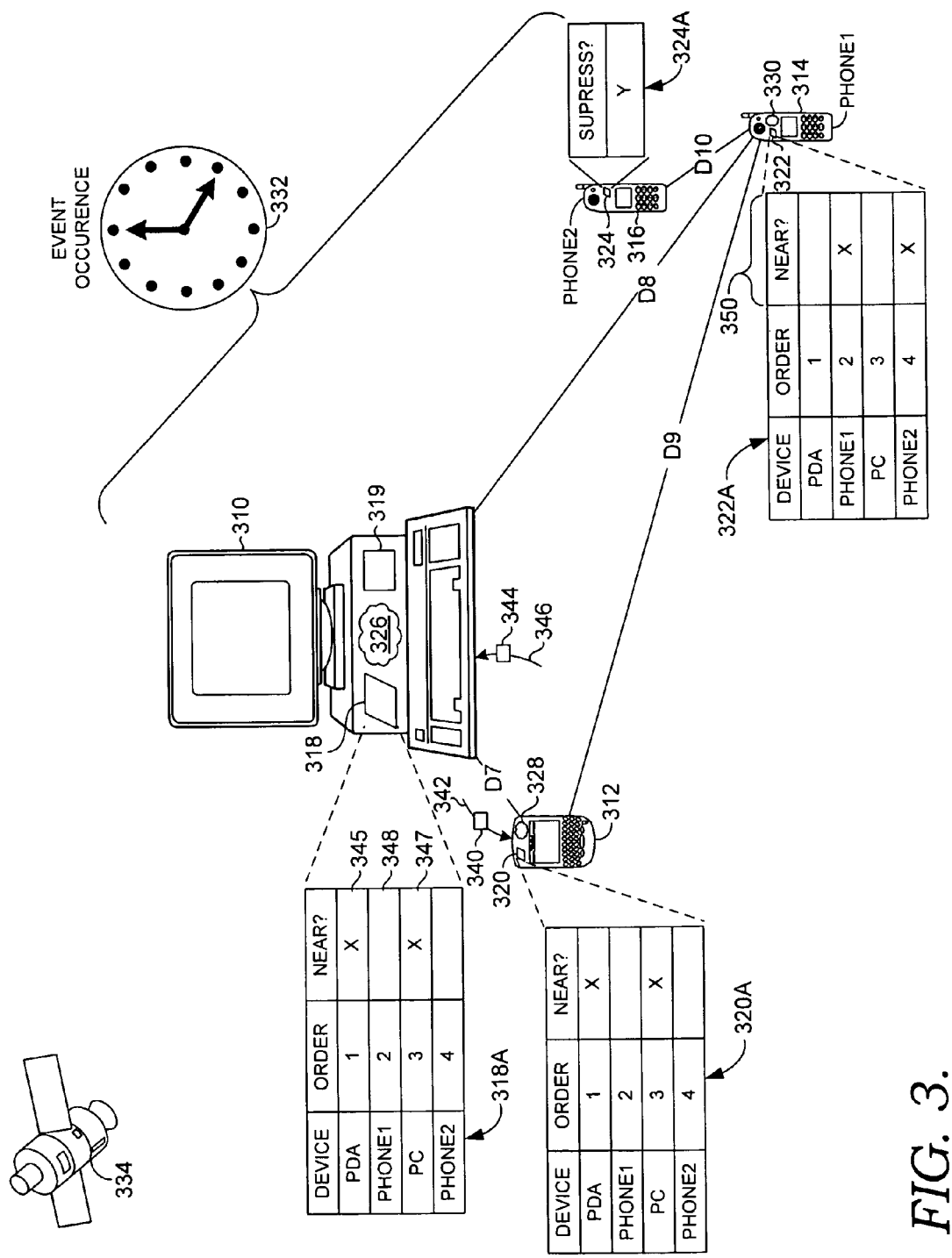
FIG. 3 depicts a relatively decentralized embodiment of the present invention.

All of the data structures do not need to be the same. They might be different based on sets of nearby devices. FIG. 3 is meant to illustrate that PC 310 and PDA 312 are proximate to each other but not proximate to first phone 314, which is proximate to second phone 316. When we speak of something being proximate to something else we mean that it is within a threshold proximity. Although we have given separate reference numerals to individual data structures, we will also associate reference numerals with expansions of those data structures so as to be able to talk about them. Although given separate reference numerals, these are meant to be the same data structures as to which each corresponds.

Accordingly, data structure 318A is the same as data structure 318, data structure 320A is the same as data structure 320, data structure 322A is the same as data structure 322, and data structure 324A is the same as data structure 324. Note that while data structures 318A and 320A are the same, they are not the same as data structure 322A (see particularly the respective "near" column). Data structures 318A and 320A indicate that PDA 312 and PC 310 are nearby each other. This can be seen by the presence of an "X" in the "near" cells 345 and 347 (and corresponding cells and data structure 320A). Blank cell 348 indicates that first phone 314 is beyond the relevant threshold proximity associated with either PC 310 or PDA 312.

If it were the case that first phone 314 recently moved beyond the relevant threshold proximities of PC 310 and PDA 312, then, by way of example, information 340 might flow at a step 342 to PDA 312 that indicates that only PC 310 is within a threshold proximity from it. Similarly, information 344 might flow at a step 346 to PC 310 to indicate that only PDA 312 is within a threshold proximity from it. Accordingly, if a common-calendared event occurred 332, then only PDA 312 would present a notification of the occurrence of the events, based on its higher ordering with respect to PC 310.

As previously mentioned, the data structures do not need to be the same. Consider data structure 322A. Data structure 322A indicates that first phone 314 is within a threshold proximity of second phone 316, which is indicated by the respective X's in "near" column 350. The example of FIG. 3 also illustrates that multiple sets of devices can operate independently. That is, the two cell phones can have event notifications managed between them at the same time that event notifications are managed between PC 310 and PDA 312. For example, if a certain event were to occur 332, and it was calendared on first and second phones 314 and 316, then event notification would be suppressed on second phone 316 but presented by way of first phone 314 based on the respective data structures 322A and 324A.

Figure 4:
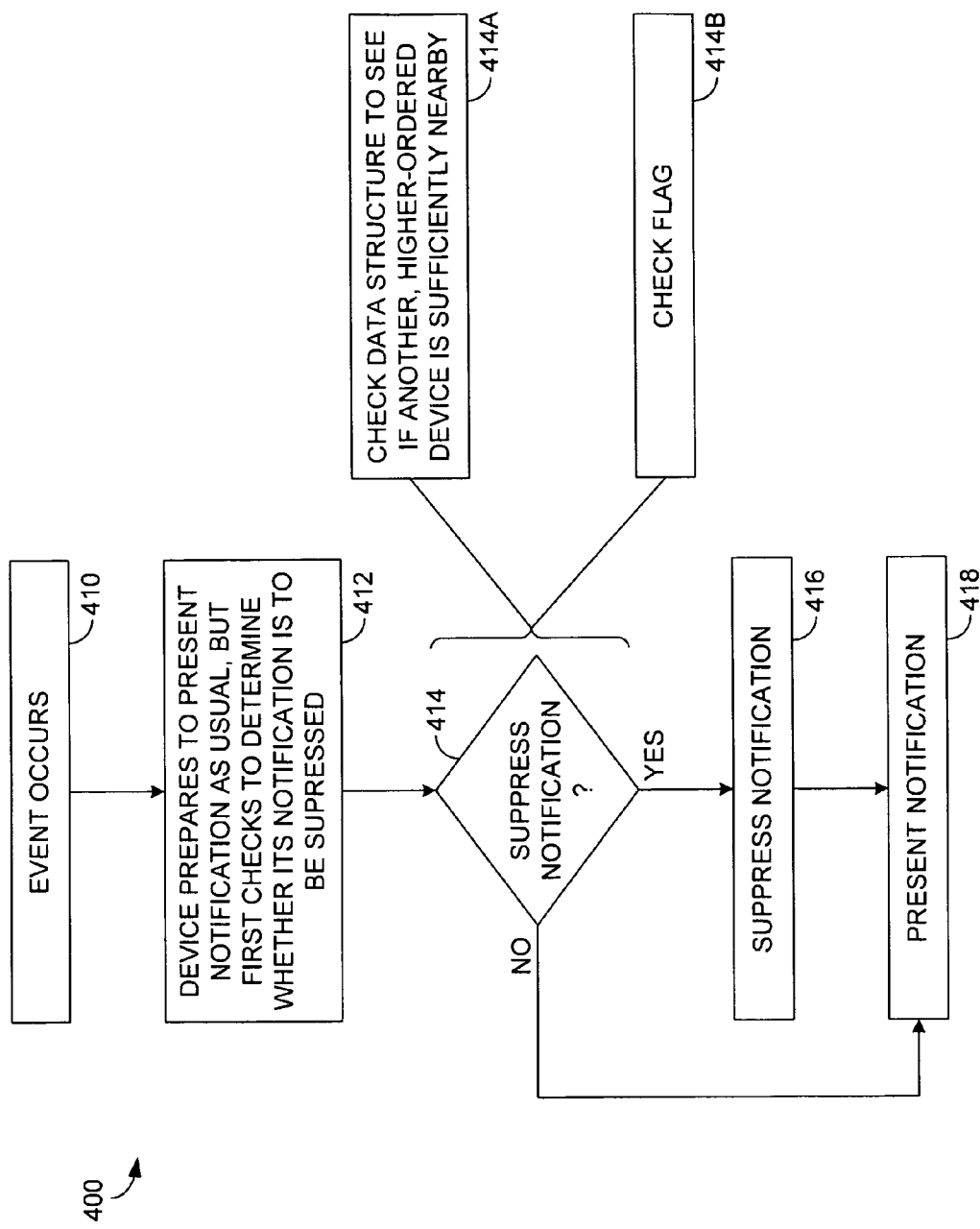
FIGS. 4-7 are flow charts that depict illustrative methods for intelligently providing notification of event occurrences according to various embodiments of the present invention.

Turning now to FIG. 4, an illustrative flow diagram associated with an embodiment of the present invention is provided and referenced generally by the numeral 400. At a step 410, an event occurs. As previously mentioned this might be the occurrence of a reminder, the occurrence of an actual event itself, and the various types of events and include things such as meeting appointments, birthday reminders, sporting events, and any number of things that person wishes to receive some sort of notification incident to an occurrence of the same.

At a step 412, a device prepares to present a notification as usual, meaning perhaps, as it would absent our technology. But based on an embodiment of our invention, it first checks to determine whether its notification is to be suppressed. This determination is made at a step 414. If the notification is to be suppressed, then the event notification is suppressed at a step 416. If the notification is not to be suppressed, then a notification is presented at a step 418 by way of the relevant device. In some embodiment, an override feature can be included so that notifications are always presented either for a time or based on user-configured settings.

In some embodiments, a determination as to whether a notification should be suppressed at a step 414 can occur in a variety of ways. We show two illustrative ways by way of FIG. 4. A first illustrative way 414A is to reference a data structure to determine whether another, higher-ordered device is sufficiently nearby. We have previously described this concept of certain devices being ordered higher than others. In other embodiments, a flag can be referenced, which is represented by numeral 414B. This flag might take on a variety of names as well as a variety of formats. As previously mentioned, an illustrative format might be as simple as a single bit, which is set to a first value and might indicate suppression, and the other value would indicate lack of suppression.

Figure 5:
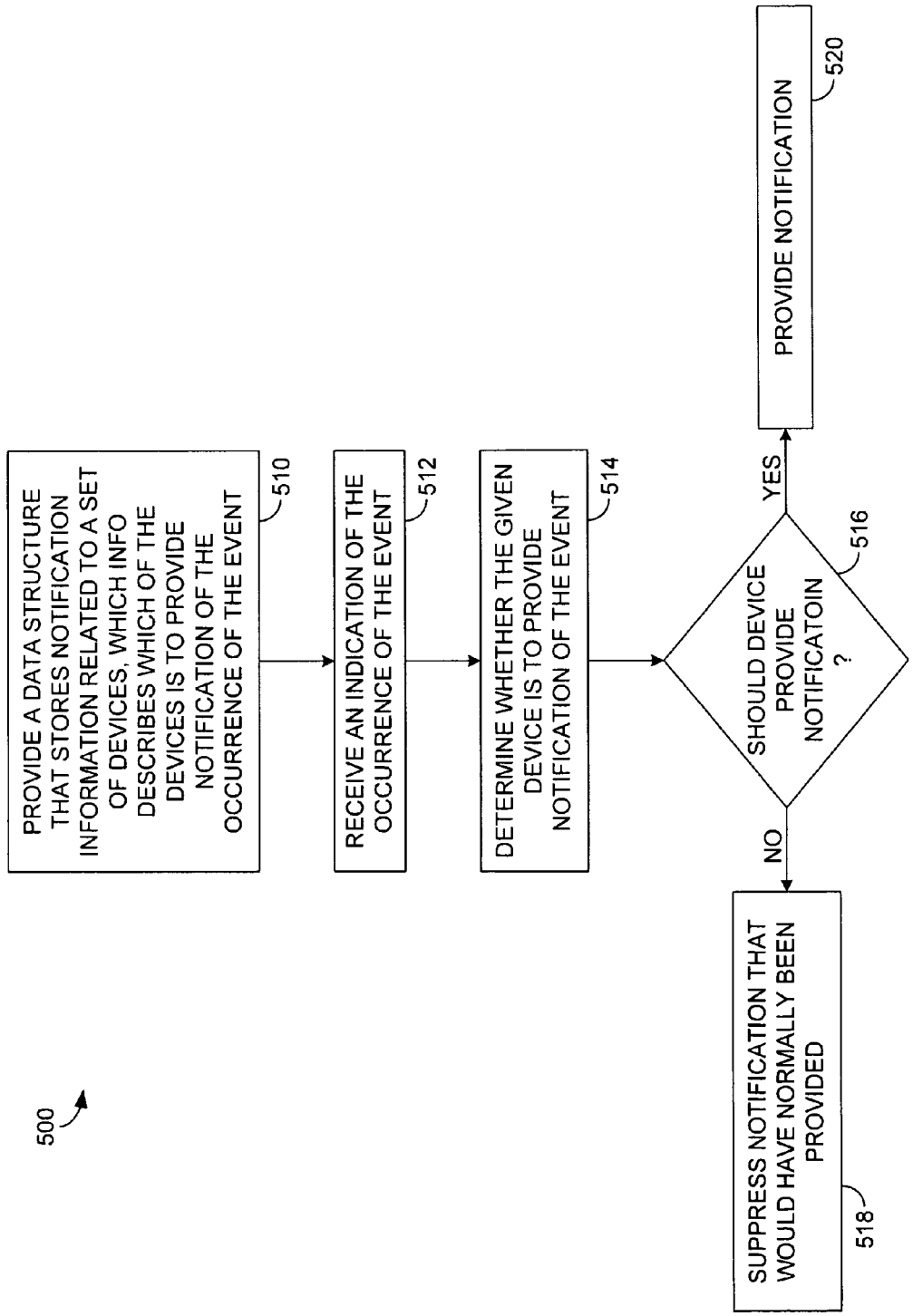

Turning now to FIG. 5, an illustrative method for intelligently providing notification of an occurrence of an event according to an embodiment of the present invention is provided and referenced generally by the numeral 500. A data structure embodied on computer-readable media is provided at a step 510 that stores notification information that is related to a set of devices. The information describes which of the devices is to provide notification of the occurrence of the event (a common-calendared event). The notification information is derived based on a proximity of the devices to each other in one embodiment.

At a step 512, an indication of the occurrence of the event is received. In some embodiments that occurs at each device. Absent the data structures (or equivalent methodology), the devices would operate independently, and each would provide notifications irrespective of the other devices. We continue this example from the purview of a given device (among the set of devices). At a step 514, a determination is made as to whether the given device is to provide notification of the event. As mentioned, it would be otherwise configured to present the given notification absent the data structure, in which case the device would normally present the given notification (as mentioned).

Per step 516, if the device is to present the notification, then it does so at a step 520; and if not, the notification is suppressed at a step 518.

Figure 6:
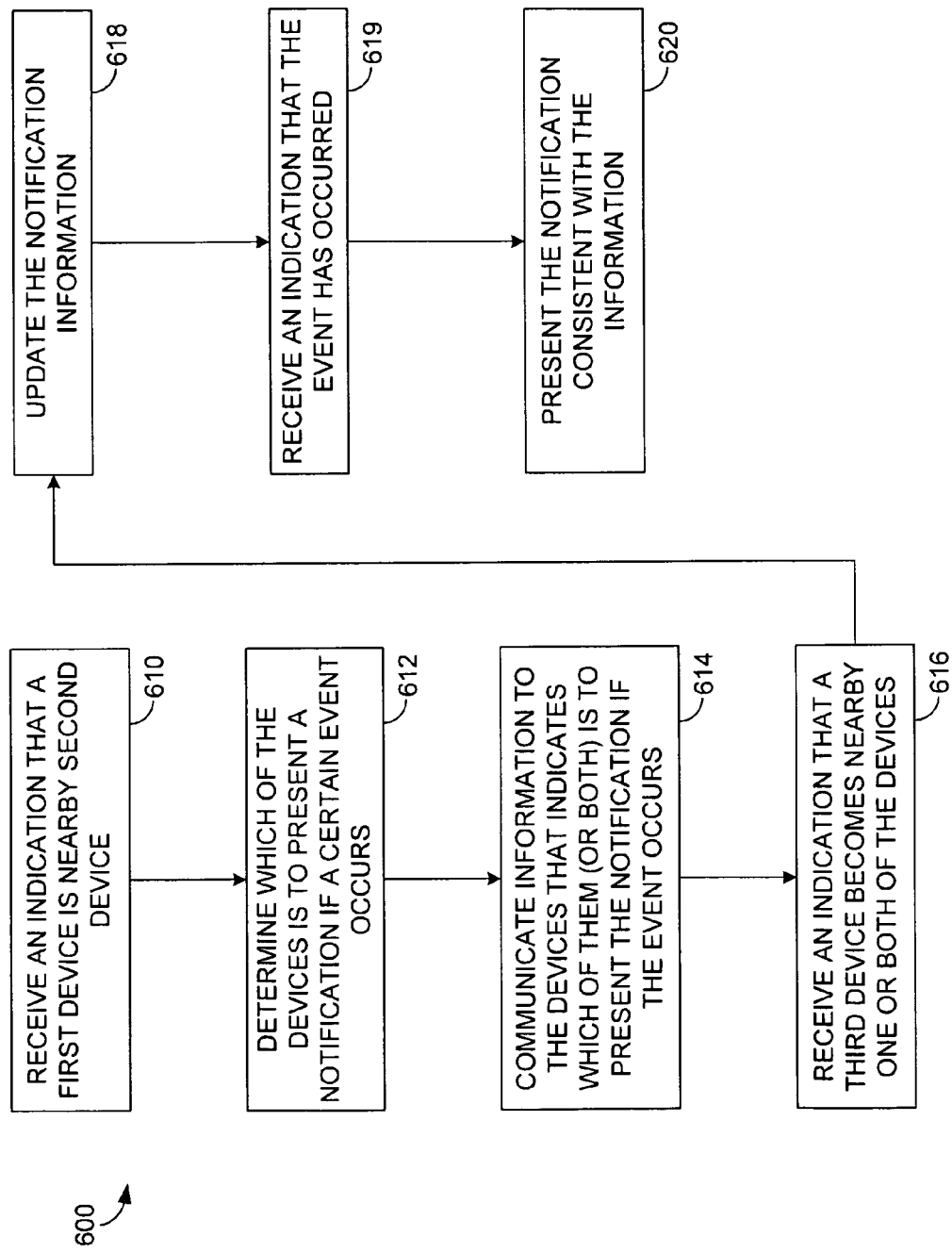

Turning now to FIG. 6, another illustrative method for intelligently providing notification of an occurrence of an event according to an embodiment of the present invention is provided and referenced generally by the numeral 600. At a step 610, an indication is received that a first device is nearby a second device. In this example, both devices are independently configured to provide a notification of an occurrence of some event. At a step 612, determination is made as to which of the devices is to present a notification if a certain event occurs. This determination can be made by way of referencing user-defined data, default data, or dynamically updated data. For example, a determination might be made by receiving user data that indicates that a given device is to present event notification as opposed to other devices. Thus, we are using the term "determine" broadly, and realize that this might not be an actual action step as much as a preprocessing step.

At a step 614, information is communicated to the relevant devices that indicates which of them, or both, is to present notification if the event occurs. Thus, to review, we are describing an illustrative example where a user with her cell phone on her person walks into her office and sits down next to her PC. In this way, two devices have come within a threshold proximity of each other. As they do, a determination is made as to which of the devices is to present notification of a common-calendared event. This might include updating each device's relevant data structures and then referencing a highest-ordered indication.

By way of further example, assume at a step 616 that a third device becomes nearby one or both of the devices. If this were to happen, then relevant information would be updated at a step 618. At a step 619, each device receives an indication that the event has occurred. This might be as simple as each device's clock indicating that a certain time has been reached. When this occurs, then event notification or notifications will be presented consistent with the information at a step 620. In the case of a single highest-ordered device, only that device will present event notification. In the case of common or shared-highest-priority devices, then all devices with the same highest order will present notifications. Those devices that are indicated to have their event notification suppressed will not present an event notification. Absent our technology, however, such devices would have presented the notification. That is, absent, for example, the respective data structure, a given device would have presented a given notification incident to the occurrence of the respective event.

Figure 7:
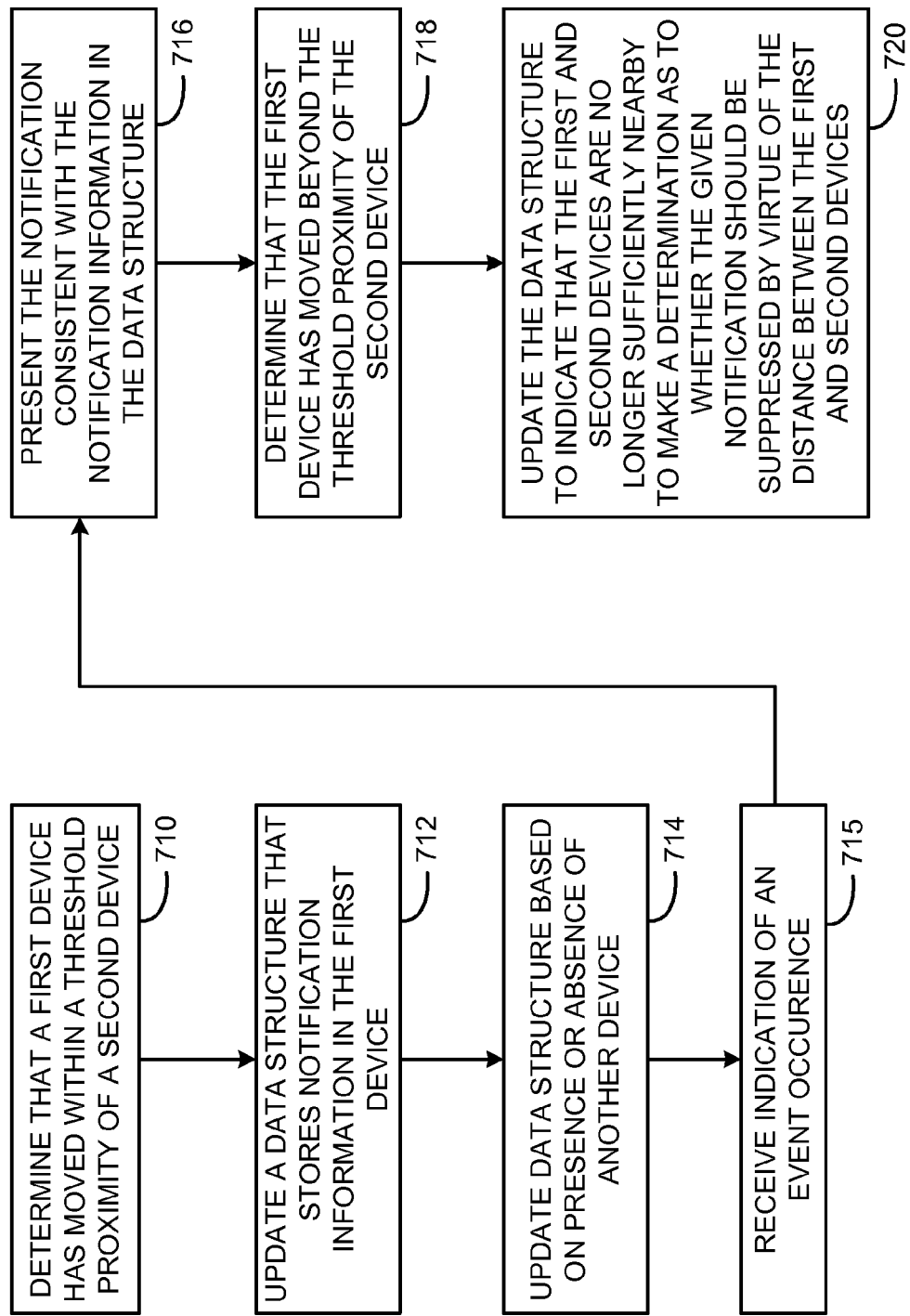

Turning now to FIG. 7, another illustrative method for intelligently providing notification of an occurrence of an event according to an embodiment of the present invention is provided and referenced generally by the numeral 700. At a step 710, a determination is made that a first device has moved within a threshold proximity of a second device. In one embodiment, one or each of these devices includes a data structure that stores notification information related to a set of particular devices, which set includes both first and second devices. With reference to FIG. 3, it might be the case that PDA 312 has moved within a threshold proximity D7 of second device or PC 310.

Incident to this occurring, a data structure is updated at a step 712 that stores information in the first device. In one embodiment this data structure is stored on computer-readable media of the first device. Moreover, the notification information indicates whether the first device should suppress a given notification of the event incident to an occurrence of the event. That is, the notification information indicates whether the first device is to provide the notification of a common-calendared event that is common to both first and second devices. Further, in one embodiment, the notification information includes an indicator that supersedes other notification-configuration settings of the first device. These other notification-configuration settings might include settings that normally operate to provide the given notification independent of the proximity of the second device. That is, the first device might include a set of default notification-configuration settings, which might be implemented when the first device works autonomously, or alone. The notification information includes information that supersedes these other notification-configuration settings.

As mentioned, the proximity might be determined by a proximity-detection component. We do not show specific numeral examples of proximity-detection components in the figures so as to not obscure aspects of the present invention; but, as mentioned, a few illustrative proximity-detection components include a radio-frequency identification (RFID) tag reader, a GPS device, a short-range wireless communicator, or a communications component itself that, if functions, indicate that two devices are sufficiently near each other to utilize this invention. We previously discussed various arrangements of this sort earlier. By way of example, a short-range wireless communicator might include a communicator adapted to communicate by way of a Bluetooth technology or an NFC device.

At a step 714, the data structure is updated based on the newfound presence or absence of another device. Assuming that a relevant event occurs, notification is presented consistent with the notification information in the data structure at a step 716. Presenting such notification consistent with the notification information would include determining whether the given device is to provide the event notification. This, in one embodiment, includes referencing the data structure, or, if different, referencing a configuration setting that indicates whether the given notification should be suppressed. By this we mean that the present invention can operate in connection with default or standard settings of a certain device or as an integrative part of those default or standard settings. In the case of where a data structure, such as data structure 230A or 318A or 338 for example is part of a devices standard settings, then determining whether the given device is to provide the notification might simply include referencing the relevant configuration settings, which might even be the data structure unless it is separate. In the case where the data structure is separate from a configuration setting, then as the case may be, reference is made to such configuration setting, which also might be a single bit.

It might also be the case that data structures such as those that we have described as well as configuration settings of a given device work in concert with each other. That is, it might be the case that a device includes one or more configuration settings that indicate whether it should provide notifications of events as they occur. It might further be the case that based on the data in a data structure such as data structure 230A, that a specific configuration setting gets set. As mentioned, either the data structure and/or the configuration setting could be a single bit.

At a step 718, a determination is made that the first device has moved beyond the threshold proximity of the second device. Incident to this happening, the data structure(s) are updated at a step 720 to indicate that the first and second devices are no longer sufficiently nearby to make a determination as to whether the given notification should be suppressed by virtue of the distance between the first and second devices. Thus, each device will act without regard to deferring to each other device. At any time, in one embodiment, the relevant device can present on its corresponding display device an indication of the current status of how event notifications will be handled. This would enable a user to determine how event notifications will be provided on a given device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-useable instructions embodied thereon that, when executed, enable a given device to perform a method of intelligently providing notification of an occurrence of an event, the method comprising:
   providing a data structure embodied on a computer-storage medium within the given device,
      (1) wherein the data structure stores notification information related to a set of particular devices, which set includes one or more particular devices including the given device,
      (2) wherein the notification information describes which of the one or more particular devices is to provide notification of the occurrence of the event, and
      (3) wherein the notification information is derived based on a proximity of the one or more particular devices to each other;
   receiving at the given device an indication of the occurrence of the event, wherein the given device is configured, without the data structure, to present a given notification of the event;
   determining whether the given device is to provide notification of the event even though it is otherwise configured to present the given notification without the data structure, in which case the device would normally present the given notification, wherein determining whether the given device is to provide the notification comprises at least one of referencing the data structure and referencing a configuration setting that indicates whether the given notification should be suppressed, wherein referencing the data structure includes inspecting the notification information to determine whether the notification information indicates that the given device is to suppress the given notification, and wherein referencing the configuration setting includes referencing a single bit, whose value indicates whether the given notification should be suppressed;
   if the given device is to provide notification of the event, then presenting the given notification; and
   if the device is not to provide notification, then suppressing the given notification.

2. The media of claim 1, wherein the notification information indicates a hierarchal arrangement of the one or more particular devices that indicates an order in which each of the one or more particular devices, if within the threshold proximity, is to provide the notification, wherein the proximity might be one of a plurality of proximities.

3. The media of claim 2, wherein the proximity of the one or more particular devices is determined by a proximity-detection component.

4. The media of claim 3, wherein the proximity-detection component includes one or more of:
   a radio-frequency identification (RFID) tag reader;
   a global positioning system (GPS) device; and
   a short-range wireless communicator.

5. The media of claim 4, wherein the short-range wireless communicator includes one or more of:
   a communicator adapted to communicate via a variation of the Bluetooth technology; and
   a near-field-communication (NFC) device.

6. The media of claim 1, wherein the proximity is on the order of meters.

7. One or more non-transitory computer-readable media having computer-useable instructions embodied thereon for enabling a computing device to facilitate a method of leveraging one or more user devices to intelligently provide notification of an occurrence of an event, the method comprising:
   receiving an indication that a first device is within a first threshold proximity of a second device, wherein the first and second devices are capable of providing a notification of an occurrence of an event;
   based on the indication, determining which of the first and second devices is to present the notification if the event occurs, wherein determining which of the first and second devices is to present the notification comprises at least one of referencing a data structure and referencing a configuration setting that indicates which of the first and second devices is to present the notification, wherein referencing the data structure includes inspecting notification information to determine whether the notification information indicates which of the first and second devices is to present the notification, and wherein referencing the configuration setting indicates which of the first and second devices is to present the notification; and
   communicating to the first and to the second device information that indicates which of the first and second devices is to present the notification if the event occurs, such that upon a happening of the event, each of the first and second devices provides notification consistent with the information.

8. The media of claim 7, wherein determining which of the first and second devices is to present the notification includes determining that both of the first and second devices are to present the notification.

9. The media of claim 8, further comprising receiving an indication that a third device is within a second threshold proximity of either the first or second device, and based on the second proximity, updating the information.

10. The media of claim 8, further comprising receiving an indication that the event has occurred and presenting the notification consistent with the information.

11. One or more non-transitory computer-readable media having computer-useable instructions embodied thereon for performing a method of intelligently providing notification of an occurrence of an event in an environment in which potentially multiple devices might provide notification of the event, the environment including a first device and a second device, the method comprising:
   determining that the first device has moved within a threshold proximity of the second device;

incident to the determining, updating a data structure that stores notification information,
(1) wherein the data structure is stored on a computer-readable media of the first device,
(2) wherein the notification information indicates whether the first device should suppress a given notification of the event incident to an occurrence of the event,
(3) wherein the notification information includes an indicator that supersedes other notification-configuration settings of the first device, which settings would normally operate to provide the given notification independent of the proximity to the second device;

presenting on a display device of said first device an indication of a status of said data structure; and determining whether the first device is to present the given notification by at least one of referencing the data structure and referencing a configuration setting that indicates whether the given notification should be suppressed, wherein referencing the data structure includes inspecting the notification information to determine whether the notification information indicates that the first device is to suppress the given notification, and wherein referencing the configuration setting includes referencing a single bit, whose value indicates whether the given notification should be suppressed.

12. The media of claim 11, further comprising receiving an indication that the event has occurred.

13. The media of claim 12, further comprising presenting the given notification consistent with the notification information in the data structure.

14. The media of claim 13, wherein the presenting includes suppressing the given notification if the first device is within the proximity to the second device and is ordered lower than the second device.

15. The media of claim 14, wherein the presenting further includes one or more of:
presenting the given notification if the first device is within the proximity to the second device and is not ordered lower than the second device;
presenting the given notification if the first device is beyond the proximity to the second device; and
presenting the given notification if an override configuration is present, wherein the override configuration overrides the notification information of the data structure.

16. The media of claim 11, further comprising determining that the first device has moved beyond the threshold proximity of the second device.

17. The media of claim 16 further comprising updating the data structure to indicate that the first and second devices are no longer sufficiently nearby to make a determination as to whether the given notification should be suppressed by virtue of a distance between the first and second devices.

* * * * *